(12) United States Patent
Reiss et al.

(10) Patent No.: US 7,424,602 B2
(45) Date of Patent: Sep. 9, 2008

(54) APPLICATION SYSTEM CONFIGURATION PACKAGES

(75) Inventors: Thomas H. Reiss, Heidelberg (DE); Klaus-Peter Lang, Brackenheim-Botenheim (DE); Andreas M. Schuh, Waldorf (DE); David M. R. Brenner, Mannheim (DE); Frank Wagner, Neckarsteinach-Neckarhausen (DE)

(73) Assignee: SAP AG, Walldorf (DE)

( * ) Notice: Subject to any disclaimer, the term of this patent is extended or adjusted under 35 U.S.C. 154(b) by 432 days.

(21) Appl. No.: 11/321,609

(22) Filed: Dec. 29, 2005

(65) Prior Publication Data

US 2007/0157170 A1    Jul. 5, 2007

(51) Int. Cl.
G06F 15/177 (2006.01)
G06F 9/44 (2006.01)

(52) U.S. Cl. .............................. 713/1; 717/121; 717/168
(58) Field of Classification Search ...................... 713/1; 717/121, 168
See application file for complete search history.

(56) References Cited

U.S. PATENT DOCUMENTS 5,640,567 A * 6/1997 Phipps ....................... 717/121
7,318,151 B1 * 1/2008 Harris .......................... 713/2
2003/0212990 A1 * 11/2003 Brodkorb et al. ............ 717/174
2005/0091346 A1 * 4/2005 Krishnaswami et al. ..... 709/220
2005/0216902 A1 * 9/2005 Schaefer ..................... 717/168

* cited by examiner

Primary Examiner—Thuan N Du
(74) Attorney, Agent, or Firm—Schwegman, Lundberg & Woessner, P.A,

(57) ABSTRACT

Various embodiments described herein relate to systems, software, and methods of utilizing application system configuration packages. Some such embodiments include maintaining a representation of one or more configuration settings of a first set of application functionality in a first package and maintaining a representation of one or more configuration settings of a second set of application functionality in a second package. This embodiment also includes maintaining, in both the first and the second packages, a representation of one or more configuration setting interdependencies between the first and second sets of application functionality. Some such embodiments further include receiving a configuration setting update to the first set of application functionality and checking the representation of the one or more configuration setting interdependencies of the first package to determine if the configuration setting update to the first set of application functionality impacts the configuration settings of the second package.

20 Claims, 6 Drawing Sheets

LDU = LOGICAL DEPOLOYMENT UNIT

BPO = BUSINESS PROCESS OBJECT

BFO = BUSINESS FOUNDATION OBJECT

RSC = REUSABLE SERVICE COMPONENT

AND  = CONFIGURATION SETTINGS

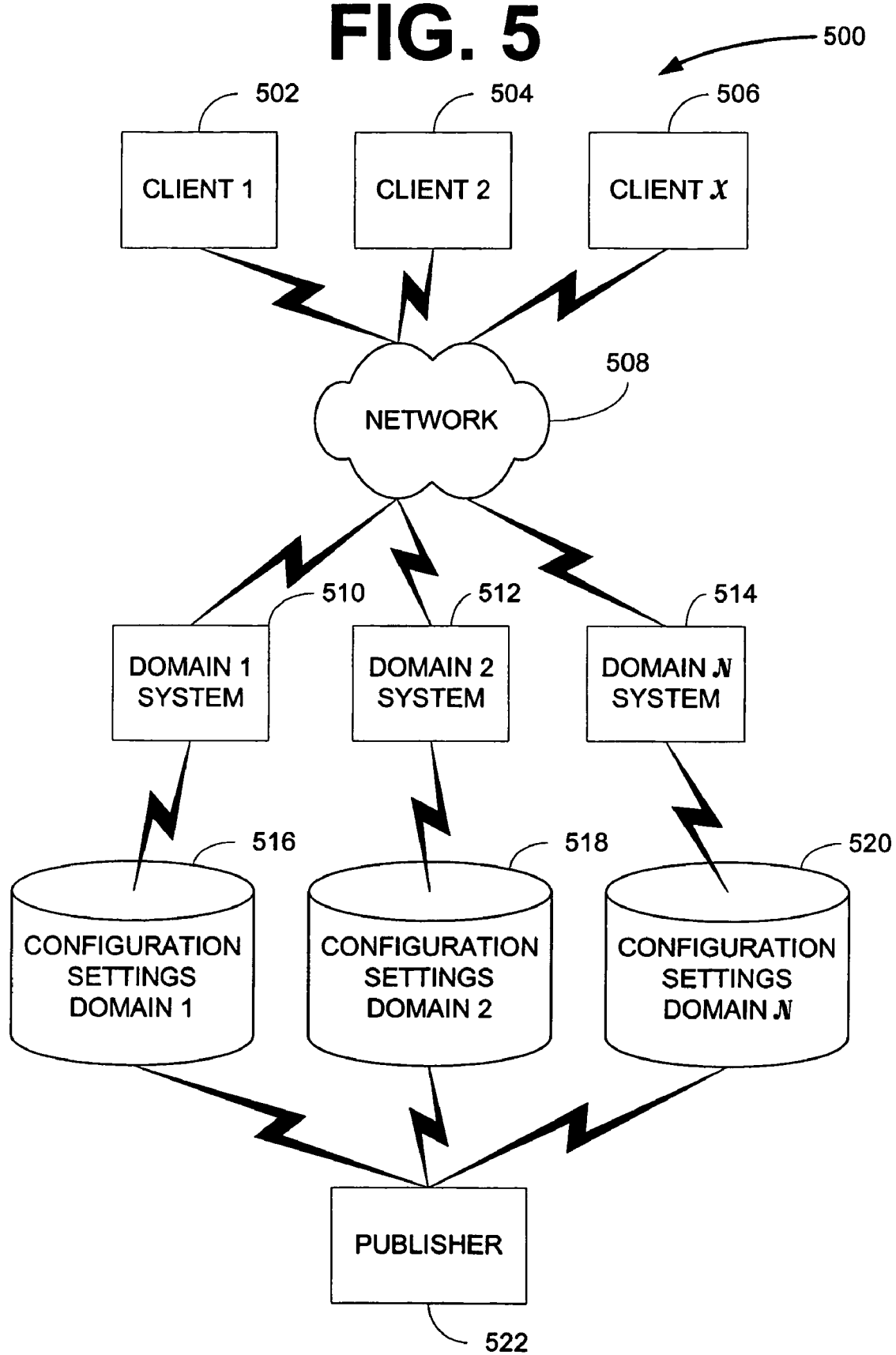

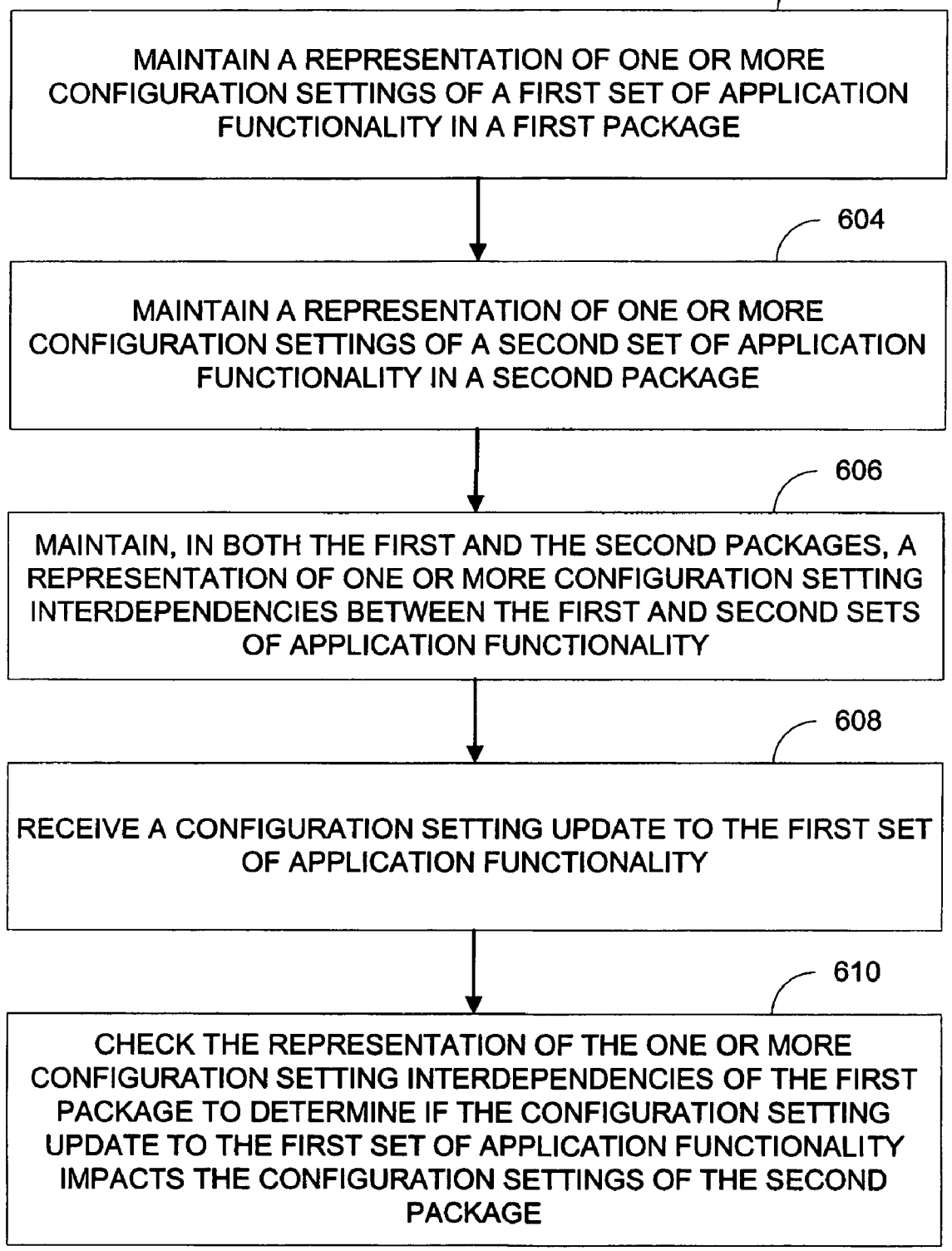

APPLICATION SYSTEM CONFIGURATION PACKAGES

BACKGROUND INFORMATION

Configuring large, complex systems, such as enterprise class systems, is a complex task. The complexity is due in part to interdependencies between various configuration settings. Further complicating configuration of such large systems is that the configuration is almost necessarily a large task, spread across multiple independent project teams. This often results in the configuration actions of one team unknowingly causing the settings of another team to be inconsistent. Such inconsistencies can cause system issues, and even system failure. Further, moving configuration settings from one application domain, such as a development domain, to another application domain, such as a production domain, provides further challenges in ensuring accuracy and timeliness of changes.

BRIEF DESCRIPTION OF THE DRAWINGS

FIG. 5 is a schematic of a networked system according to an example embodiment.

FIG. 6 is a block flow diagram of a method according to an example embodiment.

SUMMARY

Figure 1:
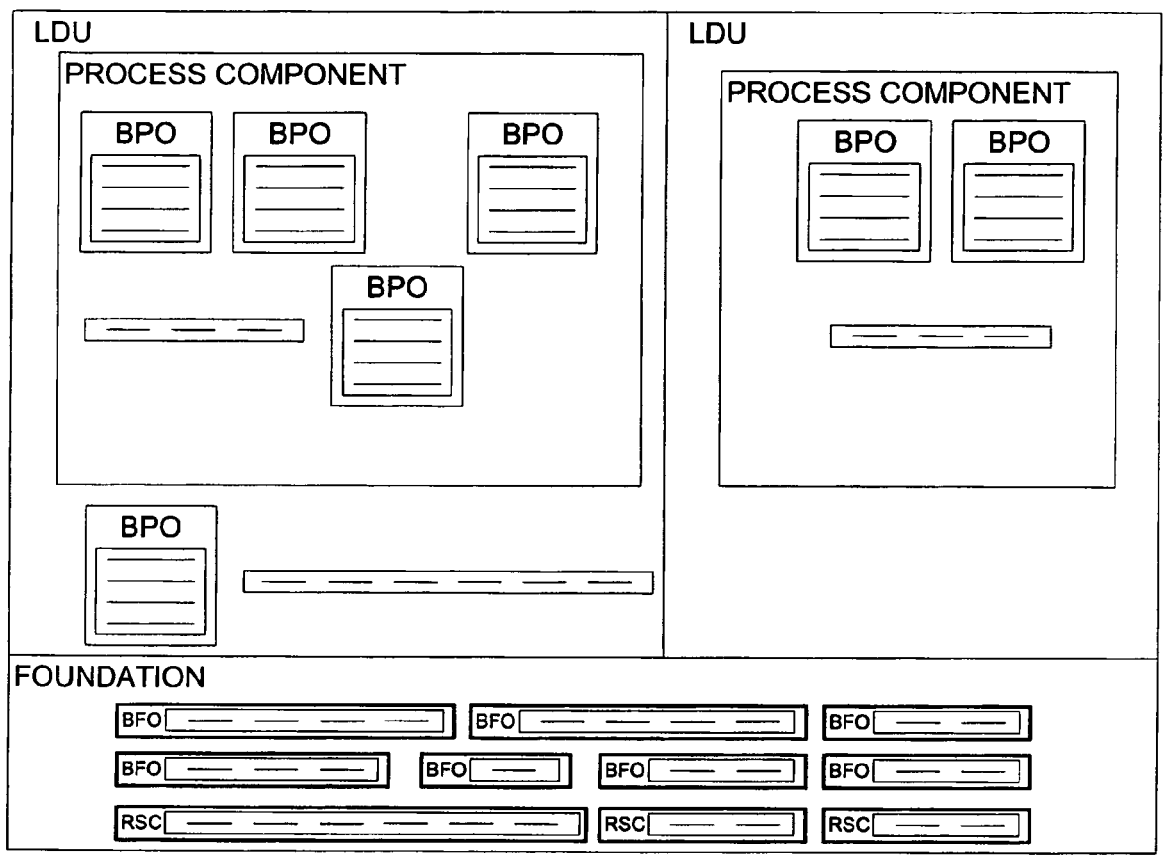
FIG. 1 is a block diagram of objects, components, and configuration settings according to an example embodiment.
Figure 1:
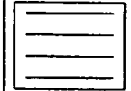
Figure 1:

Various embodiments described herein relate to systems, software, and methods of utilizing application system configuration packages. Some such embodiments include maintaining a representation of one or more configuration settings of a first set of application functionality in a first package and maintaining a representation of one or more configuration settings of a second set of application functionality in a second package. This embodiment also includes maintaining, in both the first and the second packages, a representation of one or more configuration setting interdependencies between the first and second sets of application functionality. Some such embodiments further include receiving a configuration setting update to the first set of application functionality and checking the representation of the one or more configuration setting interdependencies of the first package to determine if the configuration setting update to the first set of application functionality impacts the configuration settings of the second package.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Enterprise class systems, such as software systems available from SAP AG of Walldorf, Germany, are capable of performing many functions in many different ways. Implementation of these functions is performed through configuration of the system. However, such systems are large and, as a result, the number of configuration settings is large.

Because of the large number of system configuration settings, configuration responsibility for these systems is often broken out to teams. Individual teams are then tasked with configuring a portion of the larger system. However, in some instances, the configuration actions of one team can influence or otherwise affect the configuration actions of another team. These configuration actions can cause conflicting configuration settings. Such configuration settings are interdependent configuration settings. Interdependent configuration settings are referred to herein by dependent and interdependent, or other forms of these words. Use of one of the forms of these words below should thus be read to encompass interdependent and dependent configuration settings, unless explicitly noted otherwise.

The present subject matter, at a high-level, simplifies configuration of large, enterprise class system. However, the subject matter herein is not limited to large systems, rather application systems of various sizes can utilize the present subject matter. The present subject matter simplifies the configuration of systems by reducing the number of configuration settings to be cared for and by performing consistency checks between settings to avoid contradictory settings.

In some embodiments, the number of configuration settings to care for is reduced by eliminating, or deactivating, unneeded configuration settings. In many systems, configuration settings are maintained in configuration tables. The configuration settings stored in these tables can activate, deactivate, and modify system functionality. When a configuration setting deactivates a certain functionality, the present subject matter, in some such embodiments, reduces the number of configuration settings to care for by ignoring configuration settings that are relevant only when the certain functionality is activated.

For example, in a system including accounts payable functionality and general ledger functionality, there can be configuration settings that are applicable to both. If the accounts payable functionality in such a system is not active, the general ledger functionality does not care what the configuration settings for the accounts payable functionality are or if they even exist. Thus, if general ledger configuration settings are modified, subsequent configuration setting consistency checks between the general ledger functionality and the accounts payable functionality do not need to be performed.

In some embodiments, system configuration tasks are further simplified by performing consistency checks before configuration setting updates are committed to the configuration tables. Such embodiments leverage declared interdependencies between configuration settings. When an update to a configuration setting is requested, these embodiments identify all declared interdependent configuration settings and identify possibilities for inconsistencies. Identified possible inconsistencies are then displayed to an administrator before committing the update request to the configuration tables. In some embodiments, the administrator can then choose how to handle the possible inconsistencies and cancel the update or commit the update. In other embodiments, the administrator can be prevented from committing the updates.

For example, in a logistics systems including shipping functionality and reporting functionality, the granularity of data recorded by the shipping functionality needs to be at level equal to or finer than the granularity needed by the reporting functionality to shipping reports. Thus, an interdependency between the shipping functionality recording granularity and the reporting functionality configuration settings is declared. As a result, when an update to the recording granularity shipping functionality configuration setting is requested, the declared interdependency is check to ensure consistency. If consistent, the update can be committed. Otherwise, the administrator requesting the update is made aware of the potential inconsistency and can handle the inconsistency as needed.

FIG. 1 is a block diagram of objects, components, and configuration settings according to an example embodiment. This block diagram is an example service oriented architecture according to some embodiments. Other embodiments can utilize other architectures, such as object oriented architectures.

FIG. 1 includes logical deployment units ("LDU"), a foundation, process components, business process objects ("BPO"), business foundation objects ("BFO"), reusable service components ("RSC"), and configuration settings.

The architecture of the example embodiment in FIG. 1 includes logical deployment units. Logical deployment units correspond to a unit of a larger application system, such as an accounting unit of a larger enterprise resource planning application system. A logical deployment unit can include process components, business process objects, and configuration settings.

A process component can include business process objects and configuration settings. A process component corresponds to a component of functionality within a unit of a larger application system, such as an accounts receivable component of the accounting unit mentioned above.

Business process objects can include configuration settings and can leverage business process objects, business foundation objects, reusable service components, and other configuration settings. A business process object includes processes to perform various tasks of a process component. For example, a business process object can perform one or more accounts receivable processes of the accounts receivable process component of the accounting unit mentioned above.

The foundation includes business foundation objects and reusable service components. In some embodiments, the business foundation objects and reusable service components are leverage by other portions of an application system to perform certain tasks or provide certain services, such as system security tasks and services.

The illustrated configuration settings, in some embodiments, include configuration settings to activate and deactivate functionality of logical deployment units, process components, business process objects, business foundation objects, and reusable service components. Other configuration settings set identify data recording granularity, security privileges, reporting frequency, and virtually any other configuration setting within a system.

Figure 2:
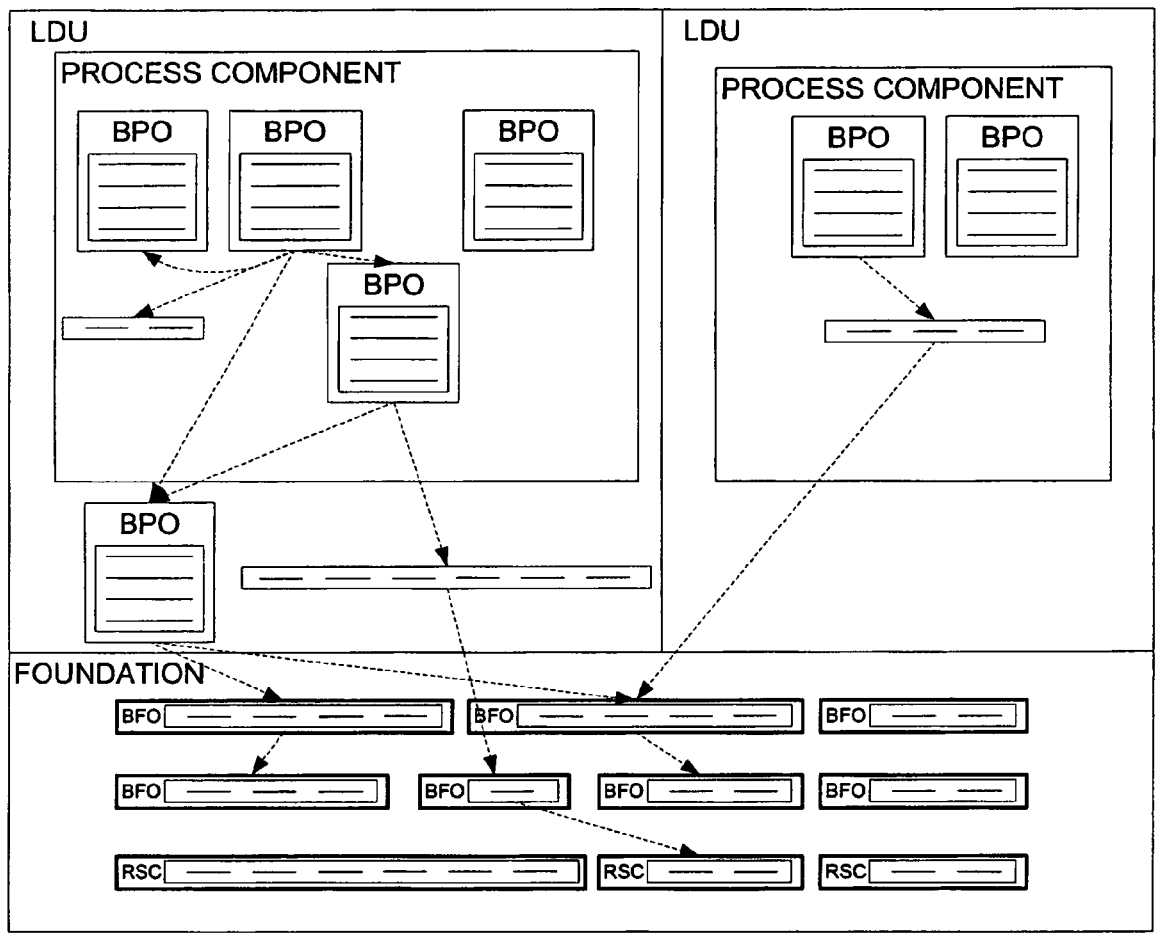
FIG. 2 is a block diagram of configuration setting interdependencies between objects, components, and configuration settings according to an example embodiment.

FIG. 2 is a block diagram of configuration setting interdependencies between objects, components, and configuration settings according to an example embodiment. The configuration setting interdependencies between business process objects, business foundation objects, reusable service components, and process component and logical deployment unit configuration settings are identified by dashed lines. The dashed lines originate from the dependent item and point to the source of the configuration setting the item is dependent upon. Thus, issues within systems can arise when more than one item points to single configuration setting, either directly or indirectly.

Figure 3:
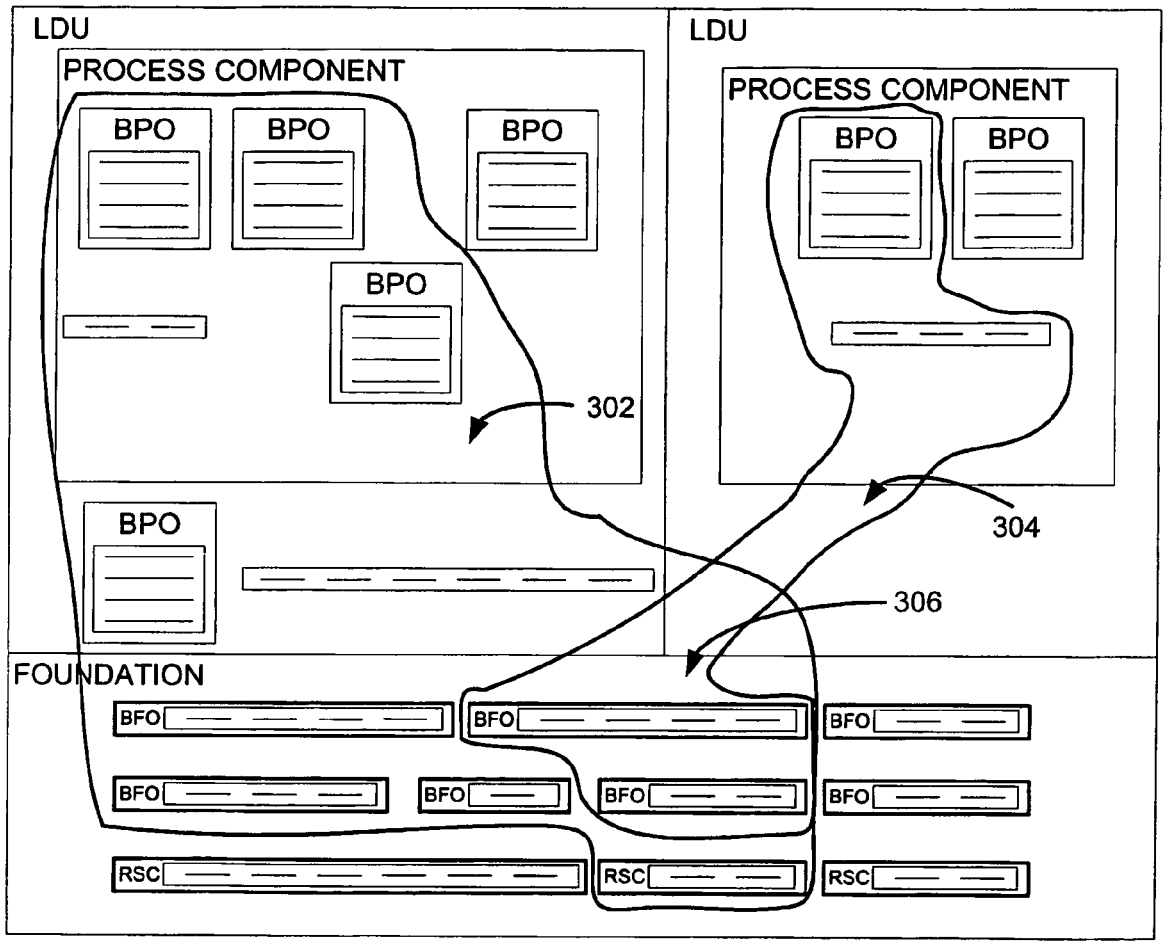
FIG. 3 is a block diagram of objects, components, and configuration settings grouped into packages according to an example embodiment.

FIG. 3 is a block diagram of objects, components, and configuration settings grouped into packages 302 and 304 according to an example embodiment. The packages 302 and 304 are derived from configuration setting dependencies illustrated in FIG. 2. The packages 302 and 304 correlate to the application functionality underlying the respective business process objects of encircled by packages 302 and 304. Thus, defining configuration setting interdependencies into packages, such as packages 302 and 304, provides a configuration setting interdependency definitions divided by application system functionality. In some embodiments, these packages can then be included within the relevant units, components, and objects to provide a source to check against in the event of a configuration setting update to ensure a change to one item of an application system does not affect another item.

In some embodiments, the packages 302 and 304 are placed within software modules. In some such embodiments, the software modules operate to interrupt configuration setting update requests and identify any interdependent configuration settings of other units, components, or objects that are activated. Such software modules can then allow the update requests to be committed if there are not any relevant interdependencies or rollback the configuration setting update request and notify an application system administrator of relevant interdependencies. Other embodiments allow an administrator to override identified interdependencies.

Figure 4:
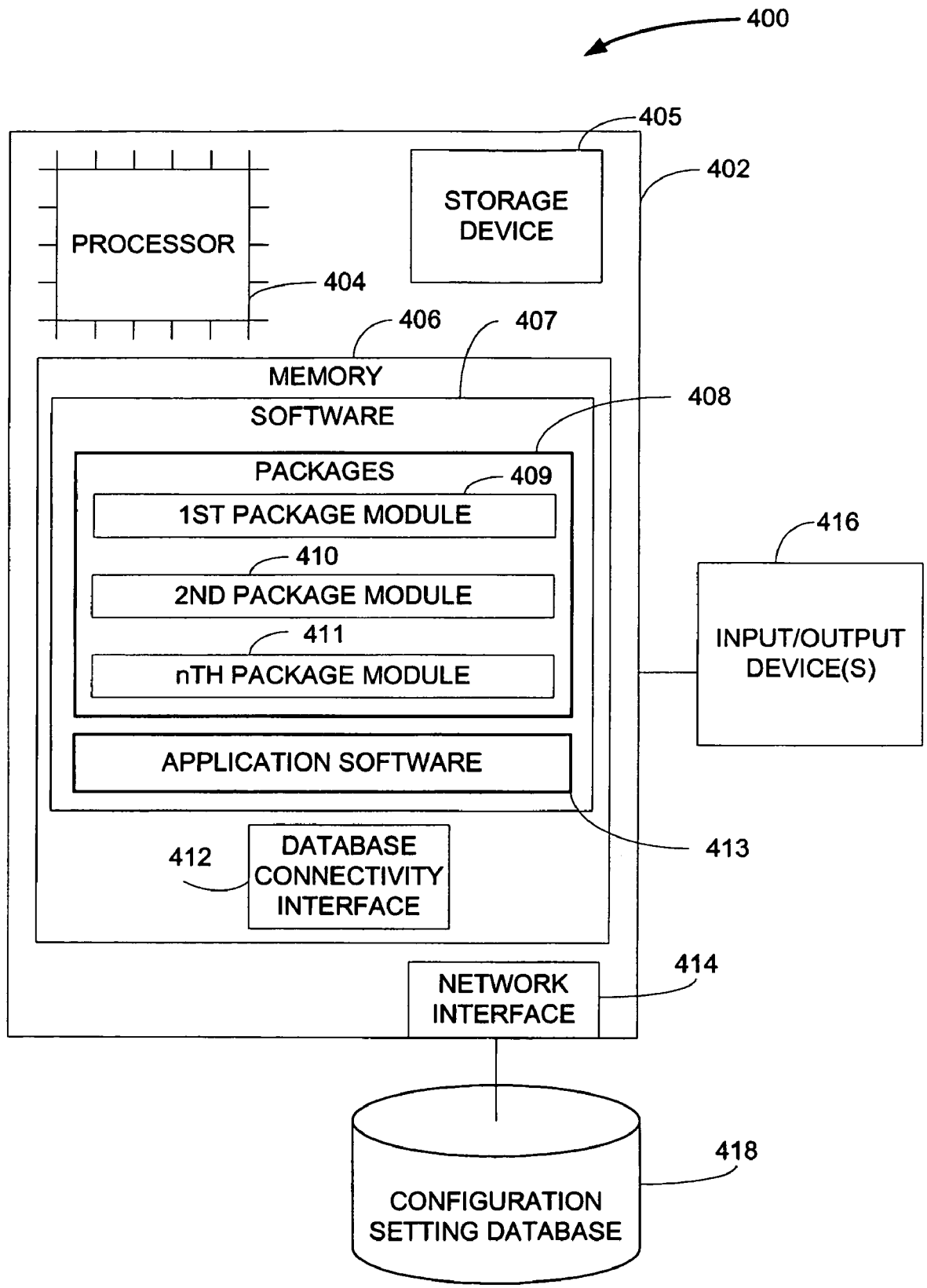
FIG. 4 is a schematic diagram of a computing system according to an example embodiment.

FIG. 4 is a schematic diagram of a computing system 400 according to an example embodiment. The computing system 400 includes a computer 402 having a processor 404, memory 406, removable storage, and non-removable storage, such as storage device 405. The memory 406 can include volatile memory and non-volatile memory. The computer 402 can include—or have access to a computing environment that includes—a variety of computer-readable media, such as volatile memory and non-volatile memory, removable storage and non-removable storage, and databases, such as configuration setting database 418.

The memory 406 and storage device 405 can include random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices including hard drives, or any other medium capable of storing machine-readable instructions and data.

The computer 402 can also include, or have access to a computing environment that includes, input and output devices 416, and communication connections, such as network interface 414. The computer 402 can operate in a networked environment using the network interface 414 to connect to one or more remote computers, such as the configuration setting database 418 and other network resources. The network can include one or more of a Local Area Network (LAN), a Wide Area Network (WAN), Internet, or other networks and combinations of networks via wired or wireless connections.

Machine-readable instructions, such as software 408, stored on a machine-readable medium, such as the memory 406 or storage device 405, are executable by the processor 404. The term "machine-readable medium" is also used to represent carrier waves on which the software 108 is transmitted. For example, a computer program capable of providing a generic technique to perform access control check for data access and/or for doing an operation on one of the servers in a component object model (COM) based system according to the teachings of the present invention may be included on a CD-ROM and loaded from the CD-ROM to the memory 406 or storage device 405. In some embodiments, the machine-readable instructions allow the computer 402 to provide generic access controls in a COM, TCP/IP, Server Message Block ("SMB"), or other protocol based, or protocol-hybrid, network systems having multiple users and servers.

The database connectivity interface 412 provides database connection functionality to processes, modules, programs, and other software executing on the computer 402. In some embodiments, the database is a database such as the configuration setting database 418. The database connectivity interface 412, in some embodiments, is an Object Database Connectivity ("ODBC") interface. In other embodiments, the database connectivity interface 412 is a Java Database Connectivity ("JDBC") interface or other suitable database connectivity interface 412 as needed in the particular embodiment.

In some embodiments, the software 407 in the memory 406 includes application software 413. The application software 413 represents one or more software programs, modules, units, or other portion of a software application. Application software 413 includes configuration settings that are stored in the configuration setting database 418.

The software 407 further includes packages 408. The packages 408 includes a 1$^{st}$ package module 409, a second package module 410, and an n$^{th}$ package module 411, where the "n" represents a total number of package modules. The packages 408 correlate to a set of interdependent configuration settings, such as the interdependent configuration settings of packages 304 and 306 in FIG. 3. In some embodiments, the package modules 409, 410, 411 are part of the application software 413 and operate to interrupt updates to configuration settings stored in the configuration setting database 418.

In some embodiments, each package module 409, 410, 411 includes a representation of one or more configuration settings of a set of application software 413 functionality. Each package 409, 410, 411 further includes a representation of one or more configuration setting interdependencies between the set of application functionality and other sets of application functionality of other the package modules 409, 410, 411.

In some embodiments, the software further includes a configuration setting update module to receive configuration setting update requests to a set of application functionality. In some embodiments, the configuration setting update modules are a part of package modules 409, 410, 411.

A configuration setting update module, in some embodiments, upon receiving a configuration setting update request checks the representation of the one or more configuration setting interdependencies in a relevant package module 409, 410, 411 to determine if the configuration setting update request will impact the configuration settings represented in another package 409, 410, 411. In some embodiments, checking the representation of the one or more configuration setting interdependencies of a relevant package module 409, 410, 411 includes determines if the received configuration setting update request to the set of application functionality includes an interdependent setting with another set of application functionality.

The configuration setting update module then commits the configuration setting update request to the configuration setting database if another set of application functionality having an interdependent configuration setting with the set of application functionality is not deployed. Or more simply, if a configuration setting interdependency exists but the functionality affected by the interdependency is not activated, the configuration setting change is made. However, if the functionality affected by the interdependency is activated, the configuration setting update module provides a warning regarding the interdependent configuration settings before committing the configuration setting update request to the configuration setting database 418.

FIG. 5 is a schematic of a networked system 500 according to an example embodiment. The networked system 500 includes client 1 502, client 2 504, and client X 506, where the X represents a total number of clients. The clients 502, 504, and 506 are interconnected via a network to a number N domains 510, 512, 514, where N is the total number of domains. Clients 502, 504, 506 represent application system users or administrators in one or more domains 510, 512, 514. The domains 510, 512, 514 represent multiple instances of the same application system, such as an application system development domain, test domain, and production domain.

Each instance of the application system includes configuration settings stored in a respective database 516, 518, 520. The configuration settings can be independently maintained within their respective domains. However, some embodiments, include a publisher server 522. The publisher server 522, in some embodiments, is operative to copy the configuration settings from one domain to another. This allows for application system configuration and testing in one domain, such as a test domain, and publishing of all or a portion of the configuration settings to another domain, such as a production domain.

FIG. 6 is a block flow diagram of a method 600 according to an example embodiment. The method 600, in some embodiments, includes maintaining a representation of one or more configuration settings of a first set of application functionality in a first package 602 and maintaining a representation of one or more configuration settings of a second set of application functionality in a second package 604. The method 600 further includes maintaining, in both the first and the second packages, a representation of one or more configuration setting interdependencies between the first and second sets of application functionality 606 and receiving a configuration setting update to the first set of application functionality 608. After receiving a configuration setting update to the first set of application functionality 608, the method 600 includes checking the representation of the one or more configuration setting interdependencies of the first package to determine if the configuration setting update to the first set of application functionality impacts the configuration settings of the second package 610.

In some embodiments, checking the representation of the one or more configuration setting interdependencies of the first package 610 includes determining if the received configuration setting update to the first set of application functionality is an interdependent setting with the second set of application functionality. If the second set of application functionality is not deployed, such embodiments include committing the configuration setting update. However, if the configuration setting update is to an interdependent configuration setting, some such embodiments, before committing configuration setting update, include providing a warning regarding interdependent configuration settings.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
    maintaining a representation of one or more configuration settings of a first set of application functionality in a first package;
    maintaining a representation of one or more configuration settings of a second set of application functionality in a second package;
    maintaining, in both the first and the second packages, a representation of one or more configuration setting interdependencies between the first and second sets of application functionality;
    receiving a configuration setting update to the first set of application functionality; and
    checking the representation of the one or more configuration setting interdependencies of the first package to determine if the configuration setting update to the first set of application functionality impacts the configuration settings of the second package.

2. The method of claim 1, wherein checking the representation of the one or more configuration setting interdependencies of the first package includes:
    determining if the received configuration setting update to the first set of application functionality is an interdependent setting with the second set of application functionality;
    committing the configuration setting update if the second set of application functionality is not deployed; and
    providing a warning regarding interdependent configuration settings, before committing configuration setting update, if the configuration setting update is to an interdependent configuration setting.

3. The method of claim 2, wherein the warning regarding interdependent configuration settings allows the configuration setting update to be rolled back without committing the update.

4. The method of claim 1, wherein the first and second packages includes a module to perform the checking of the representation for configuration setting interdependencies of received configuration setting updates.

5. The method of claim 1, wherein the first and second packages exist in a first domain, the method further comprising:
    publishing the first and second packages to a second domain, wherein the publishing causes the configuration setting representations of the first and second packages to become the configuration settings in the second domain.

6. The method of claim 1, wherein the first and second sets of application functionality are independently deployable.

7. The method of claim 1, wherein configuration settings of the first and second sets of application functionality are stored in one or more configuration tables.

8. A machine-readable storage medium including instructions which when processed, result in a machine:
    maintaining a representation of one or more configuration settings of a first set of application functionality in a first package;
    maintaining a representation of one or more configuration settings of a second set of application functionality in a second package;
    maintaining, in both the first and the second packages, a representation of one or more configuration setting interdependencies between the first and second sets of application functionality;
    receiving a configuration setting update to the first set of application functionality; and
    checking the representation of the one or more configuration setting interdependencies of the first package to determine if the configuration setting update to the first set of application functionality impacts the configuration settings of the second package.

9. The machine-readable storage medium of claim 8, wherein checking the representation of the one or more configuration setting interdependencies of the first package includes:
    determining if the received configuration setting update to the first set of application functionality is an interdependent setting with the second set of application functionality;
    committing the configuration setting update if the second set of application functionality is not deployed; and
    providing a warning regarding interdependent configuration settings, before committing the configuration setting update, if the configuration setting update is to an interdependent configuration setting.

10. The machine-readable storage medium of claim 9, wherein the warning regarding interdependent configuration settings allows the configuration setting update to be rolled back without committing the configuration setting update.

11. The machine-readable storge medium of claim 8, wherein the first and second packages includes a module to perform the checking of the representation for configuration setting interdependencies of received configuration setting updates.

12. The machine-readable storage medium of claim 8, wherein:
the first and second packages exist in a first domain, and
the instructions, which when processed, further result in the machine:
publishing the first and second packages to a second domain, wherein the publishing causes the configuration setting representations of the first and second packages to become the configuration settings in the second domain.

13. The machine-readable storage medium of claim 8, wherein the first and second sets of application functionality are independently deployable.

14. The machine-readable storage medium of claim 8, wherein configuration settings of the first and second sets of application functionality are stored in one or more configuration tables.

15. A system comprising:
a first package module including a representation of one or more configuration settings of a first set of application functionality and a representation of one or more configuration setting interdependencies between the first set of application functionality and other sets of application functionality;
a configuration setting update module to receive configuration setting update requests to the first set of application functionality, wherein the configuration setting update module, upon receiving a configuration setting update request:
checks the representation of the one or more configuration setting interdependencies of the first package to determine if the configuration setting update request to the first set of application functionality will impact the configuration settings of another package.

16. The system of claim 15, wherein the configuration setting update module, when checking the representation of the one or more configuration setting interdependencies of the first package module:
determines if the received configuration setting update request to the first set of application functionality includes an interdependent setting with another set of application functionality;
commits the configuration setting update request if another set of application functionality having an interdependent configuration setting with the first set of application functionality is not deployed; and
provides a warning regarding interdependent configuration settings, before committing the configuration setting update request, if the configuration setting update request is to an interdependent configuration setting.

17. The system of claim 16, wherein the warning regarding interdependent configuration settings allows the configuration setting update request to be rolled back without committing the configuration setting update request.

18. The system of claim 15, wherein the configuration setting update module is part of the first package.

19. The system of claim 15, wherein the first package module exists in a first domain and a second domain, the system further comprising:
a publishing module to publish the representation of the one or more configuration settings of the first set of application functionality and the representation of the one or more configuration setting interdependencies between the first set of application functionality and other sets of application functionality from the first package module of the first domain to the first package module of the second domain.

20. The system of claim 15, wherein the first set of application functionality and the other sets of application functionality are independently deployable.

* * * * *

UNITED STATES PATENT AND TRADEMARK OFFICE
CERTIFICATE OF CORRECTION

PATENT NO. : 7,424,602 B2 Page 1 of 1
APPLICATION NO. : 11/321609
DATED : September 9, 2008
INVENTOR(S) : Reiss et al.

It is certified that error appears in the above-identified patent and that said Letters Patent is hereby corrected as shown below:

In column 9, line 7, in Claim 11, delete "storge" and insert -- storage --, therefor.

Signed and Sealed this

Thirtieth Day of December, 2008

JON W. DUDAS
*Director of the United States Patent and Trademark Office*